Figure 1:
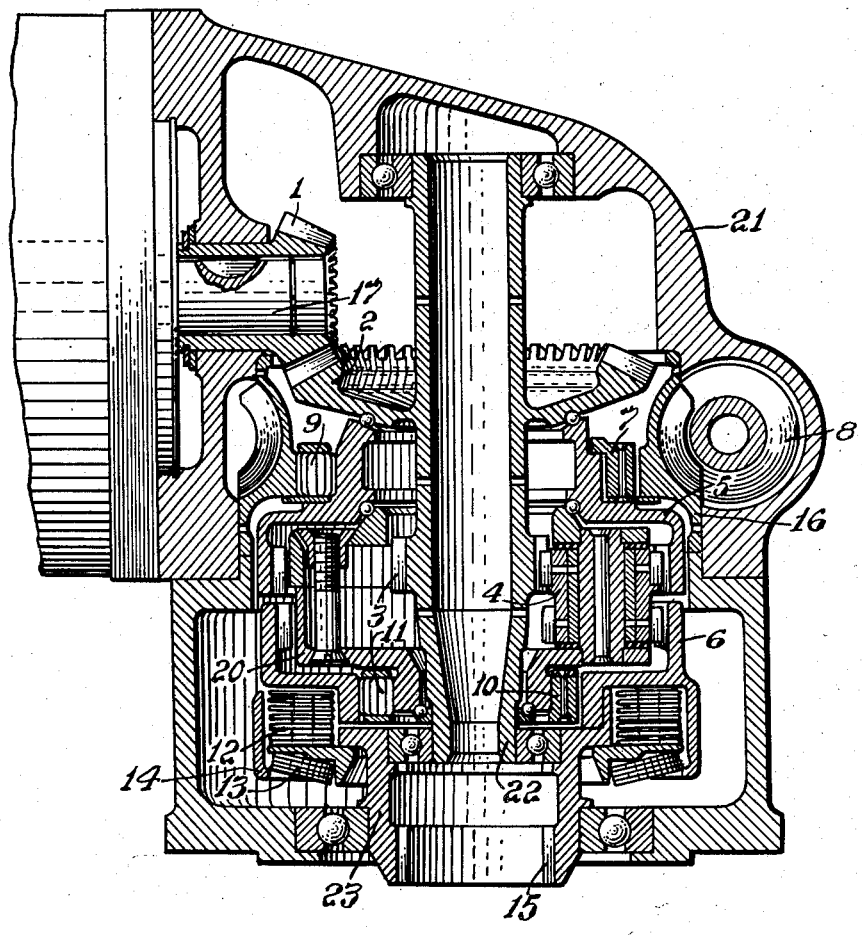

April 7, 1959     J. DOBROHRUŠKA     2,880,628

TRANSMISSION GEAR FOR A COMBINED DEVICE

Filed Sept. 18, 1957     2 Sheets-Sheet 1

INVENTOR.
Jindřich Dobrohruška

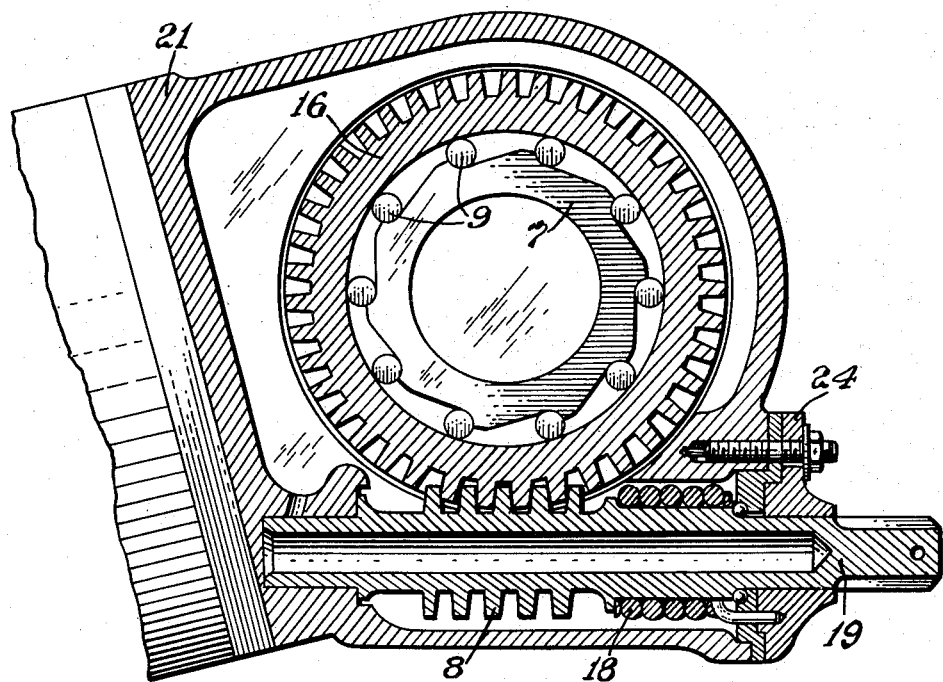

United States Patent Office 2,880,628
Patented Apr. 7, 1959

2,880,628

TRANSMISSION GEAR FOR A COMBINED DEVICE

Jindrich Dobrohruška, Beroun, Czechoslovakia, assignor to Vyzkumny a zkusebni letecky ustav, Letnany, near Prague, Czechoslovakia Application September 18, 1957, Serial No. 684,721

1 Claim. (Cl. 74—810)

The present invention relates to a transmission gear for a combined device incorporating an electric starter, an electric generator and a manually operated starter for an internal combustion engine.

Such engines are at present provided with individual electric starters and electric generators and these two separate devices are relatively expensive, heavy and occupy considerable space. This is particularly inconvenient in the case of aircraft engines, as the electric starter represents a dead weight and is without function following the starting of the engine. In aircraft having a manually operated starting device, the latter is generally arranged separately and occupies space which is rather scarce.

It is an object of this invention to provide means combining the electric starter, electric generator and manually operated starter into a single device, thus saving costs, space and weight.

An embodiment of this invention is shown, by way of example, in the accompanying drawings, where Fig. 1 is a longitudinal section through a transmission gear for this purpose, and Fig. 2 is a cross sectional view taken along the plane of symmetry of the manually operated starting device.

Referring to the drawings in detail, it will be seen that the device embodying the invention includes a transmission gear for the electric starter, the electric generator and the manually operated starter of the engine. The transmission gear is housed in a case 21 and is connected, by means of the shaft 17, with an electric motor-generator. A bevel gear 1 is firmly fixed on the shaft 17 of the electric motor-generator, and meshes with a bevel gear 2 on an auxiliary shaft 22 extending at right angles to the shaft 17. The shaft 22 has one end rotatably supported in a bearing directly carried by the case 21, while the other end of shaft 22 is rotatably supported in a bearing mounted in the carrier 23 of the crank shaft of the internal combustion engine. A gear 3 is formed on the shaft 22 and meshes with several planetary gears 4, for example, three in number, which are rotatably mounted in a cage 20. The planetary gears 4 have large and small diameter portions which respectively mesh with an upper annular gear 5 and with a lower annular gear 6. The upper gear 5 is provided with a one way engaging clutch 7 having inclined surfaces on which rollers 9 ride.

The crank of the manually operated starter is engageable with the end of a shaft 19 provided with longitudinal grooves. The shaft 19 carries a worm 8 meshing with the worm wheel 16 which forms an outer race for the rollers 9. The worm wheel 16 is coupled to the ring gear 5 by the one way clutch 7 and rollers 9 when the wheel 16 is turned in the direction causing the rollers 9 to ride up the inclined surfaces of clutch 7. A one way engaging spring 18 surrounds the shaft 19 and has one of its ends fixed to a cover 24 of the case 21 (Fig. 2).

The lower annular ring gear 6 is provided with a friction clutch in the form of plates 12 between gear 6 and carrier 23. The plates 12 are resiliently pressed together by a nut 14 acting upon the plates 12 by way of cup springs 13. The carrier 23 is provided with grooves 15 and is directly keyed on the crank shaft of the internal combustion engine.

The planetary gear cage 20 has, on its lower part, a one way engaging clutch 10 with rollers 11, by means of which the cage 20 is rotatably connected with the lower annular ring gear 6 when the latter is driven from the engine crankshaft.

As the above described transmission gear combines an electric starter, an electric generator and a manually operated starter in one device, its operation will be different for each use thereof.

A. If the electric motor-generator acts as an electric starter, the bevel gear 1 keyed on the shaft 17 of the motor-generator meshes with the bevel gear 2 on the shaft 22 to rotate the latter. The spur gear 3 on the shaft 22 engages with the differential planetary gears 4 which, in turn, mesh with the upper ring gear 5 and the lower ring gear 6. The rotation of the lower ring gear 6 is transmitted by the friction clutch plates 12 to the carrier 23 which is keyed by the grooves 15 on the crankshaft of the combustion engine. The above gear train provides a high transmission ratio between the electric motor and the engine, for example, a ratio of 102:1. Due to the firm connection of the carrier 23 to the crankshaft, the expensive disconnecting devices of the present starters are eliminated.

B. When the motor-generator acts as electric generator, the crank shaft of the combustion engine keyed to the carrier, 23, rotates the lower annular ring gear 6 byway of the friction clutch plates 12. The mechanical resistance of the motor-generator tends to cause rotation of the planetary cage 20 in the direction for locking the clutch 10 with the rollers 11, so that the lower annular ring gear 6, the planetary cage 20, the differential planetary gears 4 and the shaft 22 rotate as a unit. The bevel gear 2 of the shaft 22 engaging the bevel gear 1 drives the motor-generator at a low transmission ratio, for example 1:2.5.

C. When using the manually operated starter, the crank fitted on the grooved shaft 19 is used to manually rotate the latter and the worm 8 thereon turns the worm wheel 16. Due to the rotation of the worm wheel 16, the clutch 7 with the rollers 9 becomes locked, so that the upper annular ring gear 5 is made to rotate with the worm wheel 16. The upper annular ring gear 5 drives the lower ring gear 6 by way of the differential planetary gears 4 and the rotation of the gear 6 is transmitted by the friction clutch to the carrier 23 which is keyed on the crank shaft of the combustion engine. The above operation achieves a transmission ratio of, for example, 8:1, that is, a reduced speed. The shaft 19 is squeezed by the one way operating spring clutch 18, in case it is turned in the wrong direction, and thus does not allow any further movement in that wrong direction. Thus the possibility of injury to the attendant is eliminated, which otherwise could occur in case of a back fire of the internal combustion engine.

What I claim:

A transmission gear for a combined device incorporating an electric starter, an electric generator and a manually operated starting device for an internal combustion engine comprising a case, a bevel gear fixed on the shaft of the electric generator motor located rotatably in said case, an auxiliary shaft, a bevel gear fixed on said auxiliary shaft and meshing with said bevel gear on the generator motor shaft, a spur gear fixed on said auxiliary shaft, a cage with differential planetary gears arranged coaxially with said auxiliary shaft, one set of said differential planetary gears meshing with said spur gear on said auxiliary shaft, an upper and a lower toothed annular ring gear arranged coaxially with said auxiliary shaft and located rotatably with respect to said auxiliary shaft, said annular ring gears each meshing with a related set of said differential planetary gears, a worm wheel arranged coaxially with said auxiliary shaft and rotatable with respect to the latter, a one way engaging clutch arranged between said upper annular ring gear and said worm wheel, a shaft for bearing the crank of the manually operated starting device, a worm fixed on the last mentioned shaft, said worm engaging with said worm wheel, a one way engaging clutch fixed to said case and allowing only a one way movement of said last shaft of the manually operated starting device, a further one way clutch arranged between said lower annular ring gear and said cage and allowing a free one way relative movement between said lower ring gear and cage, means for attachment to the shaft of the internal combustion engine, and a friction clutch between said lower ring gear and said means for attachment to the engine shaft.

References Cited in the file of this patent
UNITED STATES PATENTS 2,466,461     Mauric et al. _____ Apr. 5, 1949